No. 695,196. Patented Mar. 11, 1902.
J. R. CUYKENDALL.
APPARATUS FOR PREPARING CORN FOR CANNING.
(Application filed Jan. 2, 1901.)
(No Model.) 4 Sheets—Sheet 1.
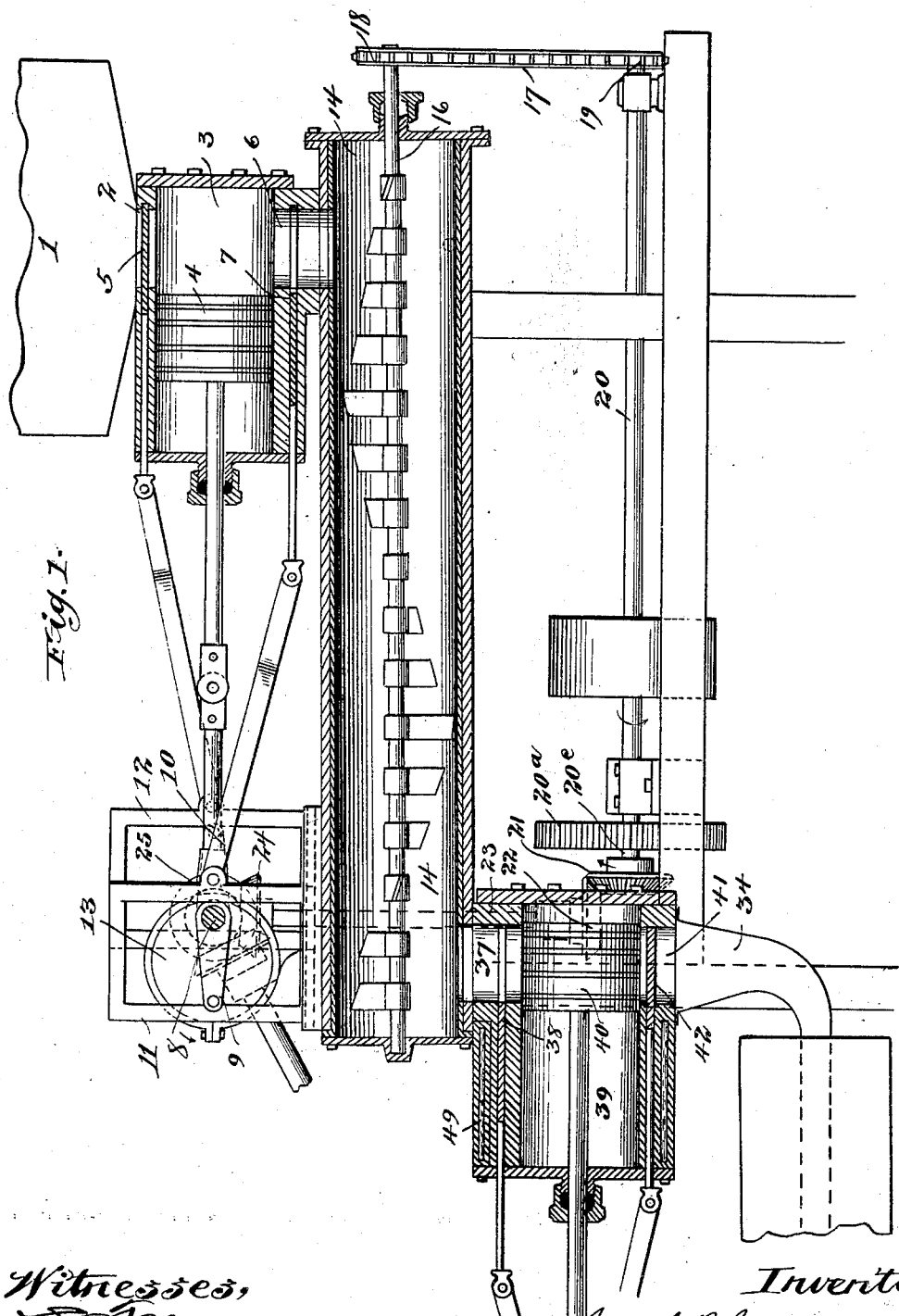
Witnesses,
Inventor,
Jacob R. Cuykendall
By Offield Towle Linthicum
Attys.

No. 695,196. Patented Mar. 11, 1902.
J. R. CUYKENDALL.
APPARATUS FOR PREPARING CORN FOR CANNING.
(Application filed Jan. 2, 1901.)
(No Model.) 4 Sheets—Sheet 2.
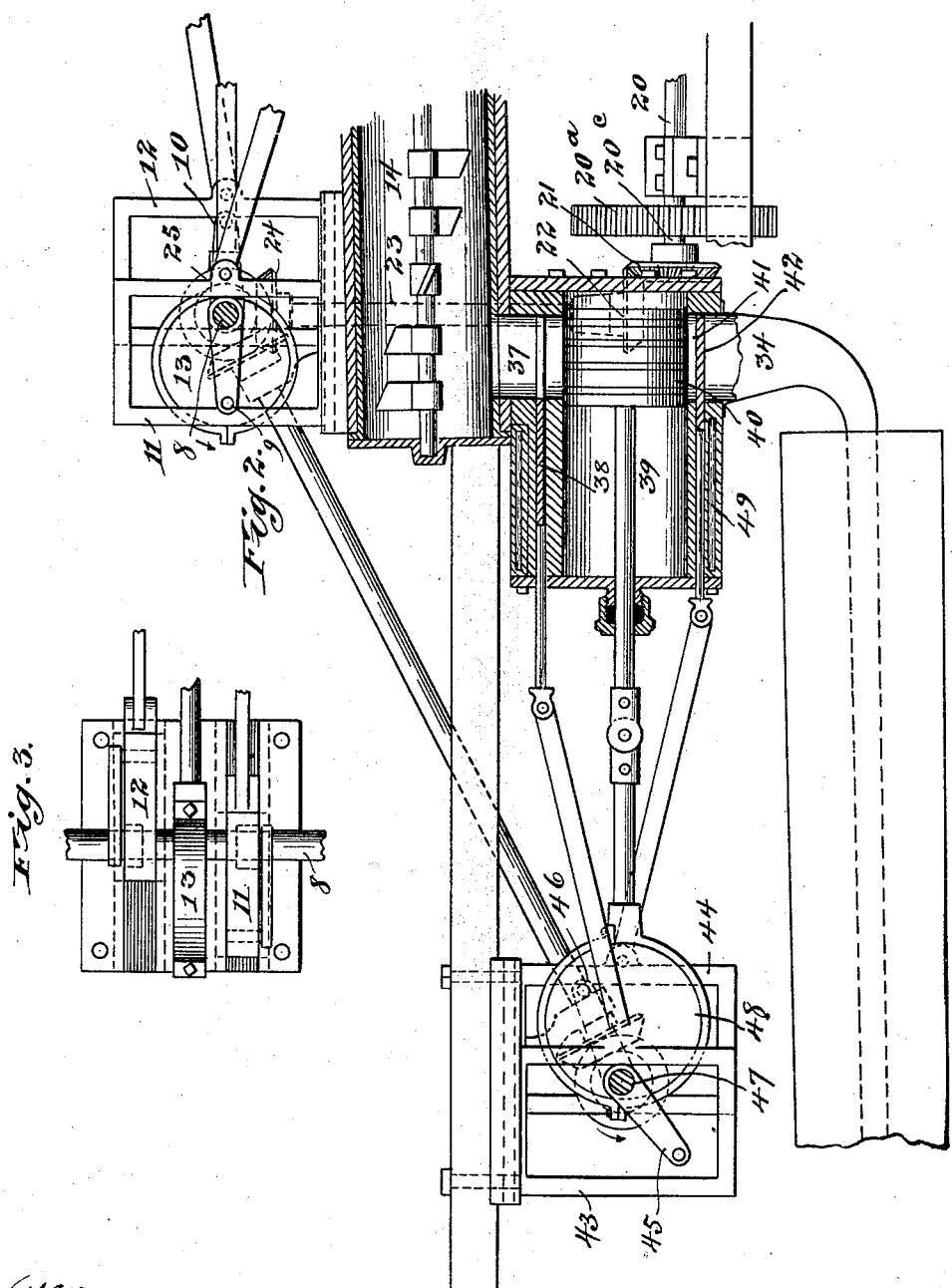

No. 695,196. Patented Mar. 11, 1902.
J. R. CUYKENDALL.
APPARATUS FOR PREPARING CORN FOR CANNING.
(Application filed Jan. 2, 1901.)
(No Model.) 4 Sheets—Sheet 3.

Witnesses,
F. S. Mann,
S. N. Pond.

Inventor,
Jacob R. Cuykendall
By Offield Towle Linthicum
Attys.

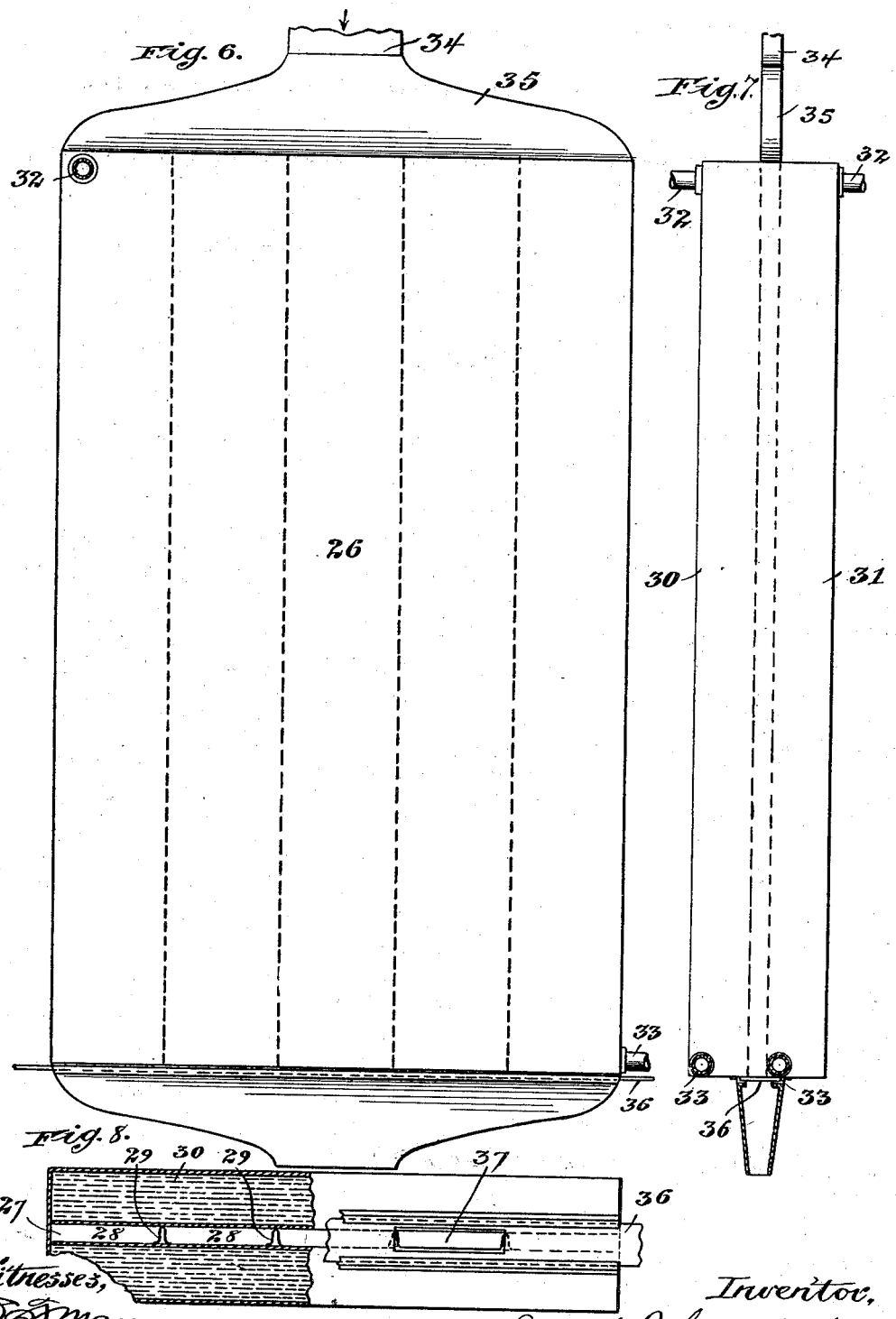

UNITED STATES PATENT OFFICE.

JACOB R. CUYKENDALL, OF HOOPESTON, ILLINOIS.

APPARATUS FOR PREPARING CORN FOR CANNING.

SPECIFICATION forming part of Letters Patent No. 695,196, dated March 11, 1902.

Application filed January 2, 1901. Serial No. 41,824. (No model.)

*To all whom it may concern:*

Be it known that I, JACOB R. CUYKENDALL, of Hoopeston, county of Vermilion, and State of Illinois, have invented certain new and useful Improvements in Apparatus for Preparing Corn for Canning, of which the following is a specification.

This invention relates to an apparatus which is particularly adapted to be used in preparing green corn for canning, although it is capable of being applied or adapted to the preparing of other vegetable products.

In using this apparatus a mixture composed of the corn or other vegetable products and such other ingredients as may be necessary or desirable to use is admitted from a hopper into a closed heater, wherein it is subjected to a cooking process in presence of superheated steam for such period as to insure the complete cooking of the mixture. From this cooking-chamber the mixture is passed to a communicating closed cooling-chamber, wherein its temperature is cooled to a point below boiling. By the use of this apparatus the cooking, cooling, and discharge of the cooled product is continuous, the mixture being passed through the apparatus gradually and at such rate as to insure its being brought to the proper condition during each stage of its treatment.

Figure 4:
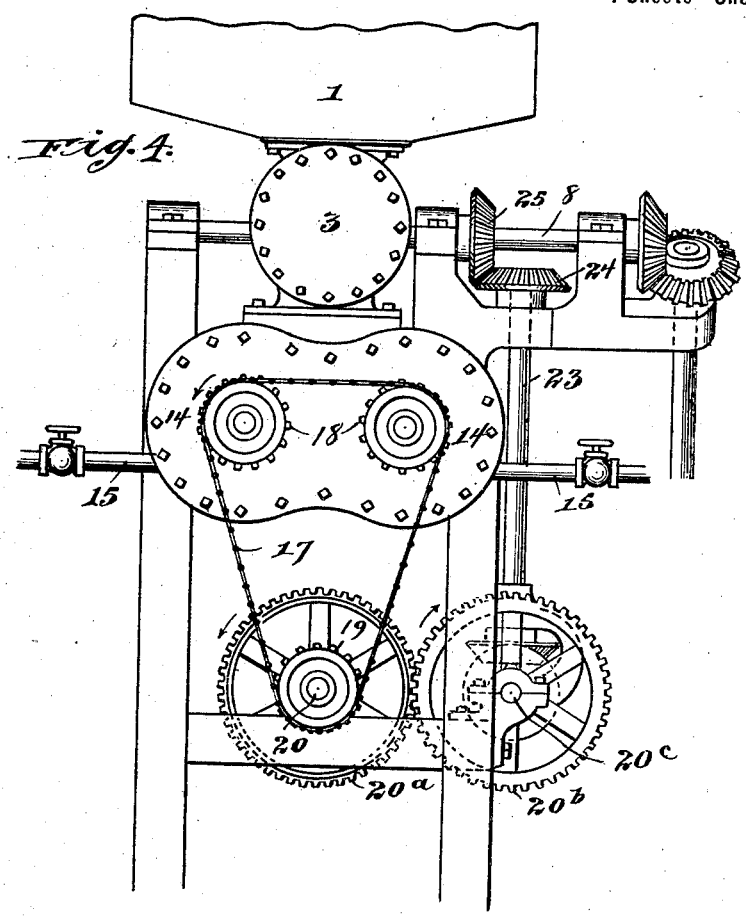
Figure 5:
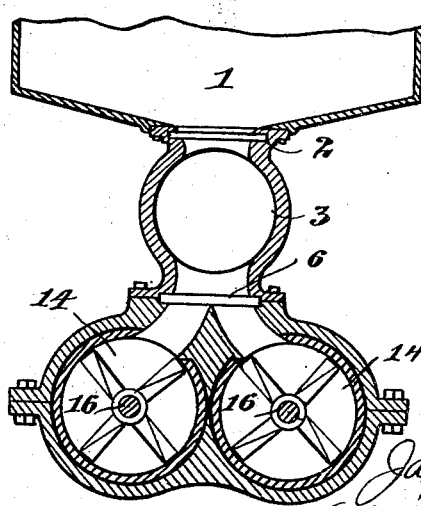

In the drawings, Figure 1 is a sectional elevation with parts broken away. Fig. 2 is a similar view showing parts omitted in Fig. 1, the view being also broken. Fig. 3 is a broken plan view of the valve-gearing. Fig. 4 is an end elevation of the apparatus with parts omitted and other parts broken away. Fig. 5 is a transverse sectional elevation through the feed-hopper, charge-cylinder, and cookers. Fig. 6 is a plan view of the cooker. Fig. 7 is a side elevation of the cooler; and Fig. 8, an end elevation, partly in section, of the same.

Describing now the apparatus as shown in the drawings, 1 represents the hopper, into which the mixture previously prepared or supplied with the necessary ingredients is charged. The lower side of said hopper is provided with an outlet 2, which communicates with a positive feed mechanism, whereby the mixture is transferred to the cooker against the internal pressure of the latter. Said feed mechanism, as herein shown, comprises a cylinder 3, within which works a power-driven piston 4, the passage 2 affording communication between the hopper and said cylinder, being controlled by a slide-valve 5, and the lower side of the cylinder being likewise provided with a port 6, similarly controlled by a slide-valve 7. As a convenient means of operating said slide-valves, so as to alternately admit a charge to the cylinder and expel it therefrom at its opposite side, upon a driven shaft 8 is mounted a pair of crank-arms 9 10, respectively, rigid with the shaft and arranged to extend in diametrically opposite directions, each arm being arranged to engage and operate a rectangular yoke, as 11 12, so as to reciprocate the slide-valves alternately, but with intervals between each reciprocation during which the valves remain stationary. The main piston 4 of the cylinder is driven synchronously with the slide-valves, preferably from the same shaft 8, by means of an eccentric 13 or other suitable connection, the arrangement being such that as the piston is withdrawn the upper valve 5 opens, admitting a charge of mixture to the cylinder, whereupon the upper valve closes, the lower valve opens, and the piston is advanced to force the mixture out through the port 6. The lower port of the cylinder communicates with a pair of steam-heated cooking-chambers 14, preferably, and as shown herein, each consisting of a long cylindric receptacle to which steam is admitted at a temperature of approximately 250° through steam-pipes 15 and each provided with a longitudinally-extending spiral conveyer 16, whereby the mixture is caused to travel gradually from the inlet end of the cylinder to its opposite end. Said conveyer is conveniently driven by means of a sprocket-belt 17, trained around sprockets 18, mounted upon the ends of the respective conveyer-shafts, externally and around a driving-sprocket 19, mounted upon a main shaft 20, which also transmits motion to the feed mechanism through spur-gears 20ª and 20ᵇ and shaft 20ᶜ, this shaft being provided with a bevel-gear 21, which intermeshes with a corresponding gear 22 upon an upright shaft 23, which transmits motion to the shaft 8 through the medium of a similar pair of bevel-gears 24 25.

From the cooker the mixture is discharged into a cooler, (designated as a whole 26,) and comprising a relatively shallow receptacle 27, divided longitudinally into a plurality of separate compartments, as 28, by means of longitudinally-extending partitions 29, said receptacle being interposed between upper and lower cooling-chambers 30 31, respectively, which may be adapted to contain cool water or other suitable cooling liquid, which is circulated therethrough through suitable inlet and outlet pipes 32 33, respectively. The cooking-receptacles communicate with the cooler through a relatively wide closed chute 34, provided at its exit end with a broadened portion 35, made wide enough to communicate with all of the several longitudinally-extending receptacles 28.

In order to maintain the pressure in the cooker, it is necessary to interpose between the cooker and the cooling-chamber some means for discharging the corn without opening direct communication between the two chambers. Such means may be substantially the same as those employed for charging the corn into the cooker. A discharge-opening 37 from the cooker is controlled by the slide-valve 38 and admits the corn or other material being treated into the cylinder 39, in which works the discharging-piston 40, the lower side of the cylinder 39 being provided with an outlet 41, controlled by the slide-valve 42 and leading into the chute 34. The valves 38 and 42 are operated by means of yokes 43 44, which are reciprocated by crank-arms 45 46 on the shaft 47, said shaft being driven from the shaft 8. The shaft 47 also has an eccentric 48 for operating the discharging-piston 40. The eccentric 48 is of such conformation that it will cause a continued backward movement of the piston after the valve 38 is closed and before the valve 42 opens, thus providing room for the expansion of the gas-pressure admitted into the discharging-cylinder with the material from the cooker. The material is thus discharged upon the forward movement of the piston under normal pressure only, such pressure being sufficient to cause the movement of the material through the several compartments of the cooler and effect its discharge. The discharge-cylinder 39 is preferably provided with a cooling jacket or chamber 49, through which a cooling medium may be circulated, thus assisting in eliminating pressure above normal within the cylinder.

The discharge end of the cooler is provided with a slide-valve 36, arranged to extend across the entire series of chambers 28 and provided with a single discharge-opening 37, adapted to be brought into register with any one of said cooling-chambers, this arrangement being adopted in order that the operator may allow the several cooling-receptacles to discharge one at a time successively into the chute or funnel which conveys the mixture to the cans to be filled. Obviously by regulating the intervals at which the cooling-chambers are opened successively and the length of time each remains open the operator may withdraw only such portions of the mixture as have become cooled to the required temperature, it being noted that any given chamber will not be allowed to remain open long enough to permit its entire contents to be discharged.

It will be understood that after being subjected to the method thus described the mixture may be canned and sealed by any preferred or suitable mechanism, it being noted, however, that the mixture will only be permitted to remain in the cooler long enough to reduce it to the proper temperature for canning, which is usually about 180°.

I claim as my invention—

1. An apparatus for preparing liquid or semiliquid cooked provisions for canning, comprising a force-pump, a steam-charged cooker into which said force-pump is arranged to discharge, a source of steam-supply communicating with said cooker, means for transfering the material from the cooker to a closed cooler, said cooler being adapted to receive the material after it is cooked, and means for controlling the discharge of the material from said cooler, substantially as described.

2. An apparatus for preparing liquid or semiliquid provisions for canning, comprising a force-pump, a closed cooking-receptacle of elongated form, and into one end of which said force-pump is arranged to discharge, a source of steam-supply admitting steam at a high temperature to said cooking-receptacle, means for agitating and transmitting the material gradually throughout the length of the cooker, a cooler and a valved connection between the cooler and the cooker, the discharge end of the cooker having a plurality of compartments and means for discharging portions of the contents of the several compartments successively, substantially as described.

3. An apparatus for preparing cooked provisions for canning, comprising a closed steam-charged cooking-receptacle, means for positively forcing measured portions of material into said cooking-receptacle, means for moving the material through the receptacle, means for withdrawing regulated quantities of the material from the receptacle, said latter means comprising an expansion-chamber having a movable wall or piston for discharging the material therefrom and a cooler into which said material is discharged, substantially as described.

JACOB R. CUYKENDALL.

Witnesses:
DAN WALLACE,
JAMES S. CATHERWOOD.